(12) United States Patent
Koc

(10) Patent No.: US 12,732,827 B2
(45) Date of Patent: Sep. 8, 2026

(54) DETERMINING OVERSHOOTING CELLS OF BASE STATIONS BASED ON MACHINE LEARNING

(71) Applicant: Ookla LLC, New York, NY (US)

(72) Inventor: Erdem Koc, Dublin (IE)

(73) Assignee: Ookla LLC, New York, NY (US)

( * ) Notice: Subject to any disclaimer, the term of this patent is extended or adjusted under 35 U.S.C. 154(b) by 381 days.

(21) Appl. No.: 18/485,693

(22) Filed: Oct. 12, 2023

(65) Prior Publication Data

US 2025/0126485 A1 Apr. 17, 2025

(51) Int. Cl.
*H04W 16/18* (2009.01)
*H04W 16/24* (2009.01)
(Continued)

(52) U.S. Cl.
CPC ........... *H04W 16/18* (2013.01); *H04W 16/24* (2013.01); *H04W 24/02* (2013.01); *H04W 24/10* (2013.01);
(Continued)

(58) Field of Classification Search
CPC ..... H04W 24/10; H04W 24/02; H04W 16/18; H04B 17/345; H04B 17/23; H04B 17/391; H04J 11/0023; H04L 5/0035; H04L 25/0254; H04L 25/0248; G06F 17/16; G06N 3/084; G06N 3/0464; G06N 3/044; G06N 3/045; G06N 3/04; G06N 3/088; G06N 7/01; G06N 3/08; G06N 3/09
See application file for complete search history.

(56) References Cited

U.S. PATENT DOCUMENTS 11,032,665 B1 * 6/2021 George ................ H04B 17/391
12,165,029 B2 * 12/2024 Babaheidarian ........ G06F 17/16
(Continued)

FOREIGN PATENT DOCUMENTS

WO 2016095826 A1 6/2016

OTHER PUBLICATIONS

Notification of Transmittal of the International Search Report and The Written Opinion of The International Searching Authority, or The Declaration received for PCT Patent Application No. PCT/US2024/049173, mailed on Jan. 16, 2025, 15 pages.
(Continued)

*Primary Examiner* — Kwang B Yao
(74) *Attorney, Agent, or Firm* — Aikin & Gallant, LLP

(57) ABSTRACT

A system can determine an overshooting cell of a base station in a mobile network. In some implementations, the system can determine a plurality of tiles to cover a geographic area. The system can determine, from a user device, a radio measurement associated with a tile of the plurality of tiles. The radio measurement may be determined based on a signal, associated with a cell of the base station, which is received by the user device when the user device is located in the tile. The system can generate a multidimensional matrix, e.g., a 2D or 3D matrix, from the plurality of tiles and the radio measurement. The multidimensional matrix may indicate a footprint of the cell. The system can invoke a machine learning model to determine, based on the footprint, an overshoot by the cell in the geographic area. Other aspects are also described and claimed.

20 Claims, 8 Drawing Sheets

(51) Int. Cl.

| | |
|---|---|
| ***H04W 24/02*** | (2009.01) |
| ***H04W 24/10*** | (2009.01) |
| ***H04W 64/00*** | (2009.01) |

(52) U.S. Cl.

CPC ....... *H04W 64/003* (2013.01); *H04W 64/006* (2013.01)

(56) References Cited

U.S. PATENT DOCUMENTS

| | | | | |
|---|---|---|---|---|
| 12,439,276 | B1 * | 10/2025 | Li | H04B 7/2606 |
| 2014/0162682 | A1 | 6/2014 | Tafreshi et al. | |
| 2015/0302123 | A1 | 10/2015 | Gloss et al. | |
| 2016/0095826 | A1 | 4/2016 | Gladding et al. | |
| 2016/0162783 | A1 * | 6/2016 | Tan | H04W 24/02 706/13 |
| 2016/0165462 | A1 * | 6/2016 | Tan | H04W 16/10 370/254 |
| 2016/0165469 | A1 * | 6/2016 | Gopalakrishnan | H04W 16/28 455/67.11 |
| 2016/0165472 | A1 * | 6/2016 | Gopalakrishnan | H04W 24/10 455/67.11 |
| 2018/0160345 | A1 | 6/2018 | Levinkron et al. | |
| 2018/0160354 | A1 * | 6/2018 | Cui | H04W 76/12 |
| 2019/0014487 | A1 | 1/2019 | Yang et al. | |
| 2019/0246292 | A1 * | 8/2019 | Shekalim | H04W 24/10 |
| 2021/0006985 | A1 | 1/2021 | Peroulas et al. | |
| 2021/0185544 | A1 * | 6/2021 | Al-Fanek | H04W 16/14 |
| 2021/0235287 | A1 * | 7/2021 | Ronen | H04W 24/02 |
| 2021/0360456 | A1 | 11/2021 | Ratnam et al. | |
| 2022/0078582 | A1 * | 3/2022 | Brooks | A61M 35/003 |
| 2022/0131626 | A9 * | 4/2022 | Singh | H04L 1/20 |
| 2022/0188954 | A1 * | 6/2022 | Callaghan | H04L 9/3231 |
| 2023/0095706 | A1 * | 3/2023 | Chen | H04W 24/02 706/23 |
| 2023/0318725 | A1 * | 10/2023 | Amiri | H04W 24/10 370/252 |
| 2024/0214092 | A1 * | 6/2024 | Dhaka | H04W 24/10 |
| 2024/0430814 | A1 * | 12/2024 | Gad | H04W 52/241 |
| 2025/0097723 | A1 * | 3/2025 | Rathore | H04W 64/003 |
| 2025/0097731 | A1 * | 3/2025 | Vasas | H04W 64/00 |
| 2025/0097763 | A1 * | 3/2025 | Johri | H04L 47/12 |
| 2025/0106655 | A1 * | 3/2025 | He | H04W 24/02 |

OTHER PUBLICATIONS

International Preliminary Report on Patentability received for PCT Patent Application No. PCT/US2024/049173, mailed Apr. 7, 2026, 9 pages.

* cited by examiner

DETERMINING OVERSHOOTING CELLS OF BASE STATIONS BASED ON MACHINE LEARNING

FIELD

This disclosure relates generally to radio frequency (RF) signal transmitting and receiving base stations and, more specifically, to determining overshooting cells of base stations in mobile networks based on machine learning. Other aspects are also described.

BACKGROUND

A radio access network (RAN) is a part of a mobile network that connects user equipment (UE), e.g., smartphones, tablets, feature phones, laptops, and Internet of things (IoT) devices, and others, to a core network infrastructure. One element within a RAN is a base station. A base station may include hardware (e.g., transceivers, antennas, and control circuitry) to form a cell, via RF signals, to provide mobile network coverage in a geographic area.

To maintain connectivity and mobility, a user device can periodically measure RF signals that belong to cells of nearby base stations. An RF signal measurement may include, for example, a cell identifier, signal power level, signal quality, and/or propagation delay, among other things.

SUMMARY

Implementations of this disclosure include utilizing a machine learning model to determine overshooting cells of base stations in mobile networks (e.g., cellular networks, such as LTE or 5G). For example, the machine learning model may utilize image classification. In some implementations, the system can determine a plurality of tiles to cover a geographic area. For example, the tiles may be equally sized regions that are adjacent to one another in a coverage area for a cell. In some cases, the tiles may be circular, rectangular, square, polygon, or another shape. A plurality of these tiles, and their position with respect to each other, may be represented in a multidimensional matrix, e.g., a 2D or 3D matrix. The system can determine, from a user device (e.g., a UE), a radio measurement associated with a particular tile of the plurality of tiles. The radio measurement (e.g., a cell identifier and a power level, signal quality, or propagation delay) may be determined based on a signal (e.g., an RF transmission), that belongs to the cell of the base station in the geographic area, that is received by the user device when the user device is located in the tile (e.g., when the user device is receiving service from the mobile network in the geographic area).

The system can generate the multidimensional matrix from the plurality of tiles and the radio measurement. The multidimensional matrix may indicate a footprint of the cell. In some cases, a transformation of the multidimensional matrix may correspond to an image, such as a black and white (e.g., grayscale) image (e.g., a 2D matrix), a color (e.g., RGB (red, green, blue)) image (e.g., a 3D matrix), or any other type of image with one or more channels (e.g., a 3D matrix). For example, utilizing one channel may result in a 2D matrix, and utilizing more than one channel may result in a 3D matrix. The system can then invoke a machine learning model to determine, based on the footprint, overshoot, or normal operation, by the cell in the geographic area. For example, the machine learning model could utilize a trained image classifier, implemented by a convolutional neural network (CNN), to make the determination when the model is trained based on images. Other aspects are also described and claimed.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Figure 1:
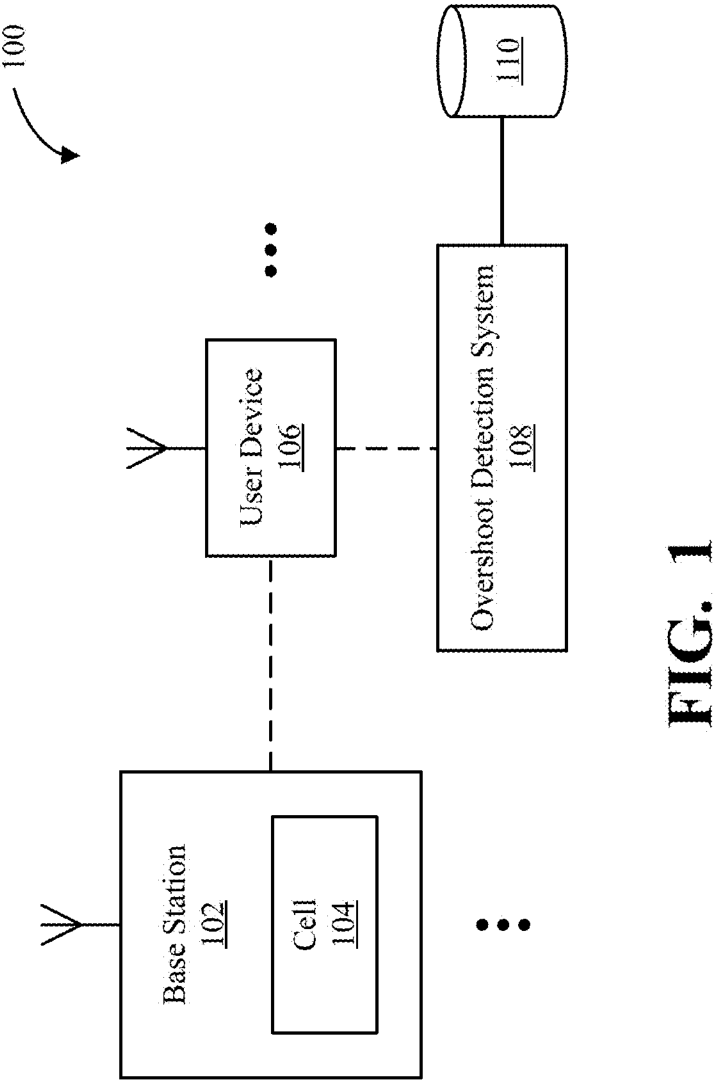
FIG. 1 is a block diagram of an example of a system for determining overshooting cells of base stations in a mobile network.

In a mobile network, an overshooting cell of a base station is a cell that transmits signals beyond an intended coverage area of the base station. In some cases, this can cause quality of service (QOS) degradation for users of user devices in the affected area. Generally, overshoot can cause interference in the signals received by user devices due to comparable or higher power levels of signals from other base stations. This may lead to undesired phenomena, such as dropped calls, handover failures, and/or poor connection quality.

Additionally, there may be a great number of base stations and cells in a network, and some of those cells may overshoot by design. For example, in some areas, due to limited availability of network hardware resources and/or local terrain, a cell may intentionally overshoot to accommodate the limited resources and/or the terrain. Thus, some overshooting may be intentional and/or unavoidable. It is therefore desirable to determine whether a cell of a base station may be overshooting, and if so, whether the overshooting should be mitigated.

Implementations of this disclosure address problems such as these by transforming RF signal measurements from user devices (e.g., user equipment (UE)) to enable utilization of a machine learning model that determines overshooting cells of base stations in a mobile network (e.g., a cellular network, such as LTE or 5G). For example, the transformation may enable the machine learning model to utilize image classification. In some implementations, the system can determine a plurality of tiles to cover a geographic area. For example, the tiles may be equally sized regions that are adjacent to one another in a coverage area for the cell. In some cases, the tiles may be circular, rectangular, square, polygon, or another shape. A plurality of these tiles, and their position with respect to each other, may be represented in a multidimensional matrix, e.g., a 2D or 3D matrix. The system can determine, from a user device (e.g., UE), a radio measurement associated with a particular tile. The radio measurement (e.g., a cell identifier and a power level, signal quality, or propagation delay) may be determined based on a signal (e.g., an RF transmission), that belongs to the cell of the base station in the geographic area, that is received by the user device when the user device is located in the tile (e.g., when the user device receiving service from the mobile network in the geographic area).

The system can generate the multidimensional matrix from the plurality of tiles and the radio measurement. The multidimensional matrix may indicate a footprint of the cell. In some cases, a transformation (e.g., resizing) of the multidimensional matrix may correspond to a black and white (e.g., grayscale) image (e.g., 2D matrix), a color (e.g., RGB) image (e.g., a 3D matrix), or any other type of image with one or more channels (e.g., a 3D matrix). For example, utilizing one channel may result in a 2D matrix, and utilizing more than one channel may result in a 3D matrix. After preparing the footprint, the system can invoke a machine learning model to determine, based on the footprint, overshoot, or normal operation, by the cell in the geographic area. For example, the machine learning model could utilize a trained image classifier, implemented by a CNN, to make the determination when the model is trained based on images (e.g., a CNN may advantageously enable extracting features based on relationships of adjacent tiles, analogous to pixels). As a result, undesirable overshooting of cells can be quickly and efficiently identified for mitigation.

In some implementations, the system can detect overshooting cells in mobile networks using RF signal scan data (e.g., radio measurements) collected from one or more user devices, such as mobile phones or other mobile devices. Based on the measurements being defined by an associated radio protocol, so that user devices can communicate with base stations according to the protocol, the system can utilize the measurements regardless of differences in models and/or operating systems of the user devices. For example, the system can advantageously disregard those differences and utilize a wide range of user equipment. Each measurement can be linked to a particular cell, time, and location in a tile, including by utilizing a location system, such as global positioning system (GPS) of the user device. For example, the Open Systems Interconnect (OSI) model can be used to map functions of mobile network components to one of multiple abstraction layers. The measurements may be in Physical (PHY) Layer of the mobile network. Operating systems in user devices may enable querying these measurements by an application that is running on an application layer. Applications running on user device can also access time and location information of the user device at different levels of precision, (e.g., via the location system). A combination of these resources may comprise spatiotemporal measurement information about the RF signal transmitted by base stations.

In some implementations, the system can shape and utilize mobile network signal measurements that have location information (e.g., coordinates) to extract geospatial patterns, and to classify potentially overshooting cells via a trained machine learning model (e.g., the CNN). This type of classification can be advantageously performed with parallel processing to enable scalability and speed. The system can receive mobile network signal measurements with location information, such as geospatial coordinates (e.g., received signal power level, signal quality, and/or propagation delay of a RF signal, associated with a base station to a user device). For example, the measurements may be taken by user devices (e.g., UEs) to assess the reception quality at that location. The system can aggregate and reshape the measurements to configure them as an input to the machine learning model. In some cases, the system can utilize the geospatial tiles like pixels of an image with the different types of signal measurements corresponding to different channels of the image (e.g., color, transparency, etc.). In some cases, the system can utilize pre-trained machine learning (e.g., a CNN image classifiers and libraries) with the network scan data.

Several aspects of the disclosure with reference to the appended drawings are now explained. Whenever the shapes, relative positions and other aspects of the parts described are not explicitly defined, the scope of the invention is not limited only to the parts shown, which are meant merely for the purpose of illustration. Also, while numerous details are set forth, it is understood that some aspects of the disclosure may be practiced without these details. In other instances, well-known circuits, structures, and techniques have not been shown in detail so as not to obscure the understanding of this description.

FIG. 1 is a block diagram of an example of a system 100 for determining overshooting cells of base stations in mobile networks. The system 100 may include a base station 102 generating a cell 104. The system 100 may also include a user device 106, an overshoot detection system 108, and a data structure 110. The base station 102 could be one of many base stations deployed in a geographic area in a RAN. The cell 104 could be one of many cells of the base station 102 (e.g., cells transmitting at various radio frequencies and/or orientations to user devices and receiving RF signals from the user devices, according to a wireless protocol). The user device 106 (e.g., a UE, such as a mobile phone or mobile device) could be one of many user devices in the geographic area and connected to the RAN. The base station 102, via the cell 104, may communicate with the user device 106 via an air interface. The user device 106 may obtain measurement results associated with the cell 104, which may then be accessible to the overshoot detection system 108. For example, the overshoot detection system 108 can query the user device 106 for the measurement results (e.g., via an air interface), then receive the measurement results from the user device 106 (e.g., via the air interface), then record the measurement results in the data structure 110.

The overshoot detection system 108 could comprise a radio optimization tool or self-organizing network (SON) module (e.g., managing hardware parts of base stations like the base station 102). The overshoot detection system 108 may utilize a machine learning model, input of which might be stored in the data structure 110, to determine cell overshoot of RF transmitting and receiving base stations in the mobile network. The machine learning model may, for example, be or include one or more of a neural network (e.g., a CNN). In some cases, the machine learning model may be trained based on image classification.

The overshoot detection system 108 can determine a plurality of tiles to cover a geographic area that includes the base station 102. The overshoot detection system 108 can also determine, from user devices like the user device 106, radio measurements associated with tiles of the plurality of tiles. For example, the user device 106 may utilize a GPS to obtain GPS information (e.g., time and location) corresponding to radio measurements in particular tiles. The user device 106 may receive the signal (e.g., an RF transmission) of the cell 104, and a cell identifier corresponding to the cell 104, according to a wireless communication protocol utilized by the base station 102 and the user device 106 (e.g., LTE or 5G). The user device 106 can then determine one or more radio measurements based on the signal in the tile. The radio measurements may include, for example, a cell identifier and a power level, signal quality, or propagation delay determined based on the signal received from the base station of the cell 104. The radio measurements may be received by the user device 106 when the user device 106 is located in a tile corresponding to a received signal. In some cases, to maintain connectivity and mobility, the user device 106 can periodically measure signals that belong to cells of nearby base stations as the user device moves from tile to tile (e.g., mobility).

Figure 2:
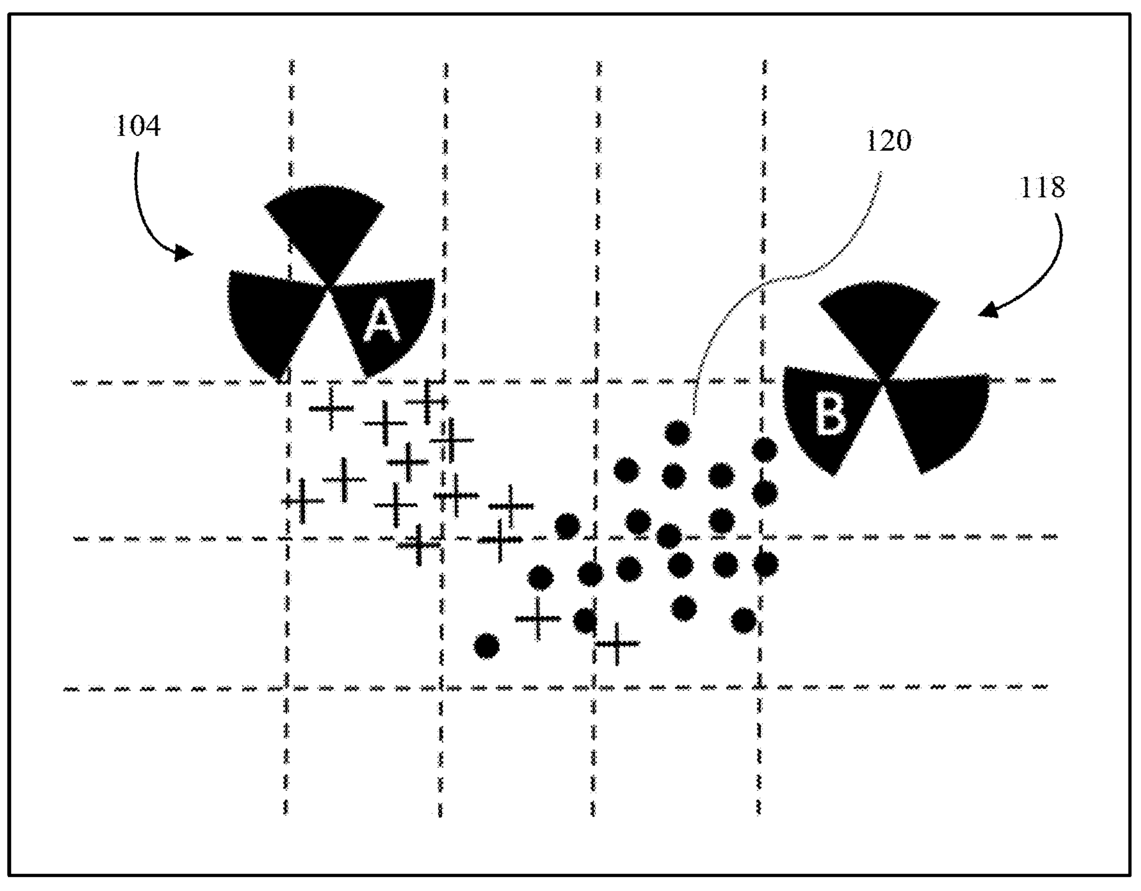
FIG. 2 is a block diagram of an example of radio measurements of signals that belong to different cells of two different base stations.

With additional reference to FIG. 2, multiple radio measurements of signals may be obtained from cells of base stations. For example, the geographic area shown in FIG. 2 may include the cell 104 (shown as "A") and another cell 118 (shown as "B"). The cell 104 and the cell 118 could be implemented in the same base station, e.g., the base station 102, or in separate base stations. The overshoot detection system 108 may determine a plurality of tiles to cover the geographic area, such as tiles 120. The overshoot detection system 108 may also determine, from one or more user devices like the user device 106, radio measurements associated with the tiles 120. For example, the user device 106 may receive signals from the cell 104 when in various tiles and may obtain radio measurements from those signals, indicated by plus (+) symbols, corresponding to those tiles. The user device 106 may also receive signals from the cell 118 when in various tiles, some being the same, and may obtain radio measurements from those signals, indicated by circle (o) symbols, corresponding to those tiles. The overshoot detection system 108 may receive those radio measurements (e.g., the plus (+) symbols and the circle (o) symbols) from the user device 106, with each measurement linked to a cell, a time, and a location.

In some cases, multiple radio measurements may be obtained in a particular tile (e.g., a tile with multiple plus (+) or circle (o) symbols in FIG. 2). In some cases, a single measurement may be obtained in a particular tile (e.g., a tile with one symbol in FIG. 2). In some cases, radio measurements from multiple cells may be obtained in a particular tile (e.g., a tile with one or more plus (+) symbols and one or more circle (o) symbols in FIG. 2). In some cases, the overshoot detection system 108 can utilize a grid system for the tiles 120 that minimizes projection distortions, e.g., keeping the tiles 120 close to square (e.g., height=width, in meters). In some cases, the overshoot detection system 108 can utilize alternatively shaped tiles, e.g., circular, rectangular, polygon, or another shape.

Based on location precisions of user devices, indicating with a high probability that a radio measurement is in a particular tile (e.g., via GPS information from a user device that indicates a time and location corresponding to a radio measurement), the overshoot detection system 108 can aggregate the radio measurements on a per tile basis. For example, the overshoot detection system 108 can calculate and assign metrics, based on the radio measurements, to each of the tiles 120 (e.g., according to a grid system).

In various cases, a tile may include a radio measurement from a user device, multiple radio measurements from a user device, a radio measurement from multiple user device, or multiple radio measurements from multiple user devices. Additionally, multiple radio measurements in a tile could comprise a same type of radio measurement (e.g., multiple measurements of power level) or different types of radio measurements (e.g., a measurement of power level, a measurement of signal quality, and a measurement of propagation delay). The overshoot detection system 108 can aggregate multiple radio measurements in a tile into one or more values or metrics based on the type of radio measurements. For example, when a tile includes multiple radio measurements of a same type (e.g., measurements of power level from one or more user devices), the overshoot detection system 108 can aggregate those radio measurements into one value in a single channel. In another example, when a tile includes multiple radio measurements of different types (e.g., measurements of power level, signal quality, and propagation delay from one or more user devices), the overshoot detection system 108 can aggregate those radio measurements into values for each type in different channels. The overshoot detection system 108 can then utilize the tiles 120 and the values to generate a multidimensional matrix, e.g., a 2D or 3D matrix. The multidimensional matrix may indicate a footprint of the cell 104, representing a coverage area where user devices like the user device 106 can connect to signals from the cell 104.

Figure 3:
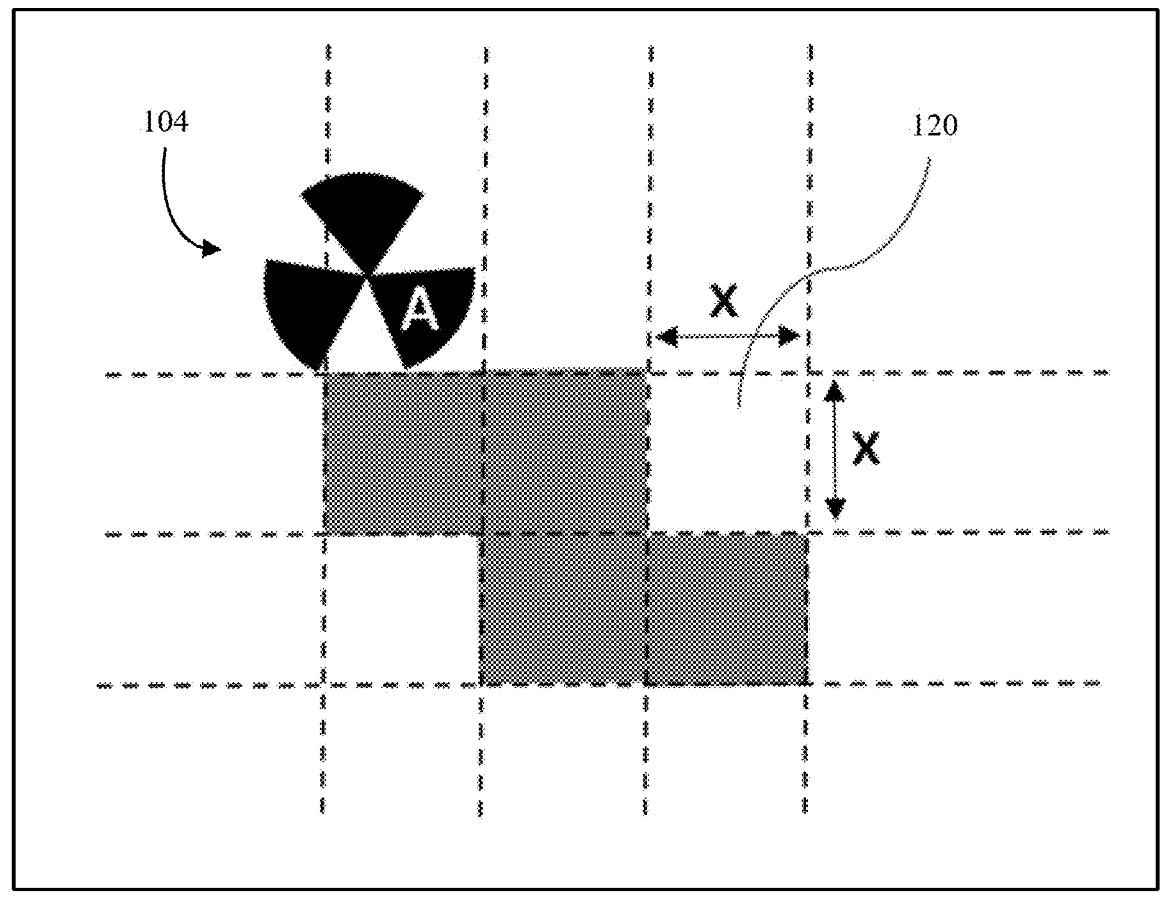
FIG. 3 is a block diagram of an example of a footprint of a cell of a base station.

With additional reference to FIG. 3, a footprint of the cell 104, with the footprint indicated by shaded tiles, is shown by way of example. The footprint may indicate a coverage area where user devices can connect to signals from the cell 104. The overshoot detection system 108 can aggregate radio measurements associated with the cells, e.g., the cell 104, into the tiles 120 to form cell footprints. In some cases, the overshoot detection system 108 can aggregate the radio measurements according to a grid system. In some cases, a transformation (e.g., resizing) of the footprint may represent a black and white (e.g., grayscale) image that could be utilized by an image classifier (e.g., an aggregation of one radio measurement per tile). In other cases, a transformation of the footprint may represent a color (e.g., RGB) image, or any other type of an image with one or more channels that could be utilized by an image classifier (e.g., aggregations of multiple radio measurements per tile). In some cases, based on the possibility of noise in the collected data, and/or the mobility of the user devices in the network, the overshoot detection system 108 can apply filtering before aggregating measurements and forming footprints of cells from the tiles 120. Thus, various filtering and aggregation operations can be applied to form cell footprints from radio measurements.

In some cases, the overshoot detection system 108 can enable a precision of measurement coordinates "p." associated with radio measurements, which is an order of magnitude less than sizes of the tiles 120 (e.g., at least one dimension of the tile has a size "x," and x>>p). In some cases, the overshoot detection system 108 can configure a number of users devices from which radio measurements are received, including during a time range, so that the number of users devices for tiles is greater than a threshold. In some cases, such as due to a potentially high number of different models of user devices that might provide radio measurements in different formats, the overshoot detection system 108 can perform sign conversions and/or scaling of radio measurements so that the measurements are comparable. In some cases, the overshoot detection system 108 can filter radio measurements based on criteria, such as those achieving a minimum signal power level from cells, e.g., the received signal power from a cell, such as the cell 104, being higher than a certain threshold (e.g., RSRP>−110 dBm for an LTE network). In some cases, the overshoot detection system 108 can vary the tile size, e.g., dimension "x" in meters. For example, the overshoot detection system 108 can configure x to be in a same order of magnitude as a shortest distance between base stations in the geographic region (e.g., an inter-site distance). In some cases, the overshoot detection system 108 can aggregate radio measurements in each tile based on determining a median for the measurements in the tile, or based on another function (e.g., average, mode, etc.). In some cases, the overshoot detection system 108 can configure a minimum number of tiles of a given size for each footprint, so that cells with smaller coverage areas or lower number of radio measurements can be excluded.

Based on the foregoing filtering, corrections, tile mapping, and/or aggregations, a footprint of a cell may be determined, which may be represented by multidimensional matrix, such as a 2D matrix of measurement arrays of size L. An element of the matrix may correspond to a position of a tile of the tiles 120 and may include filtered/aggregated values based on one or more types of radio measurements (e.g., power level, signal quality, or propagation delay). For example, for an LTE mobile network, the different types of radio measurements could include RSRP, RSRQ, and Timing Advance (TA). The multidimensional matrix may also include null values for elements corresponding to tiles that do not have radio measurements satisfying a filtering criterion. For example, some tiles may have no measurements at all, or measurements below a threshold, or measurements that exceed a possible range of a particular measurement type. The multidimensional matrix may include nulls or any selected value that indicates unavailability of data for such elements.

Based on the multidimensional matrix that is generated, the overshoot detection system 108 can generate a matrix as an input to the machine learning model. The overshoot detection system 108 can then invoke the machine learning model to determine, based on the footprint, overshoot (or normal operation) by the cell 104. For example, the machine learning model may comprise a trained image classifier implemented by a CNN. As a result, undesirable overshooting of the cell 104 can be quickly and efficiently identified for mitigation, such as changing a configuration of the cell 104 and/or the base station 102.

Figure 4:
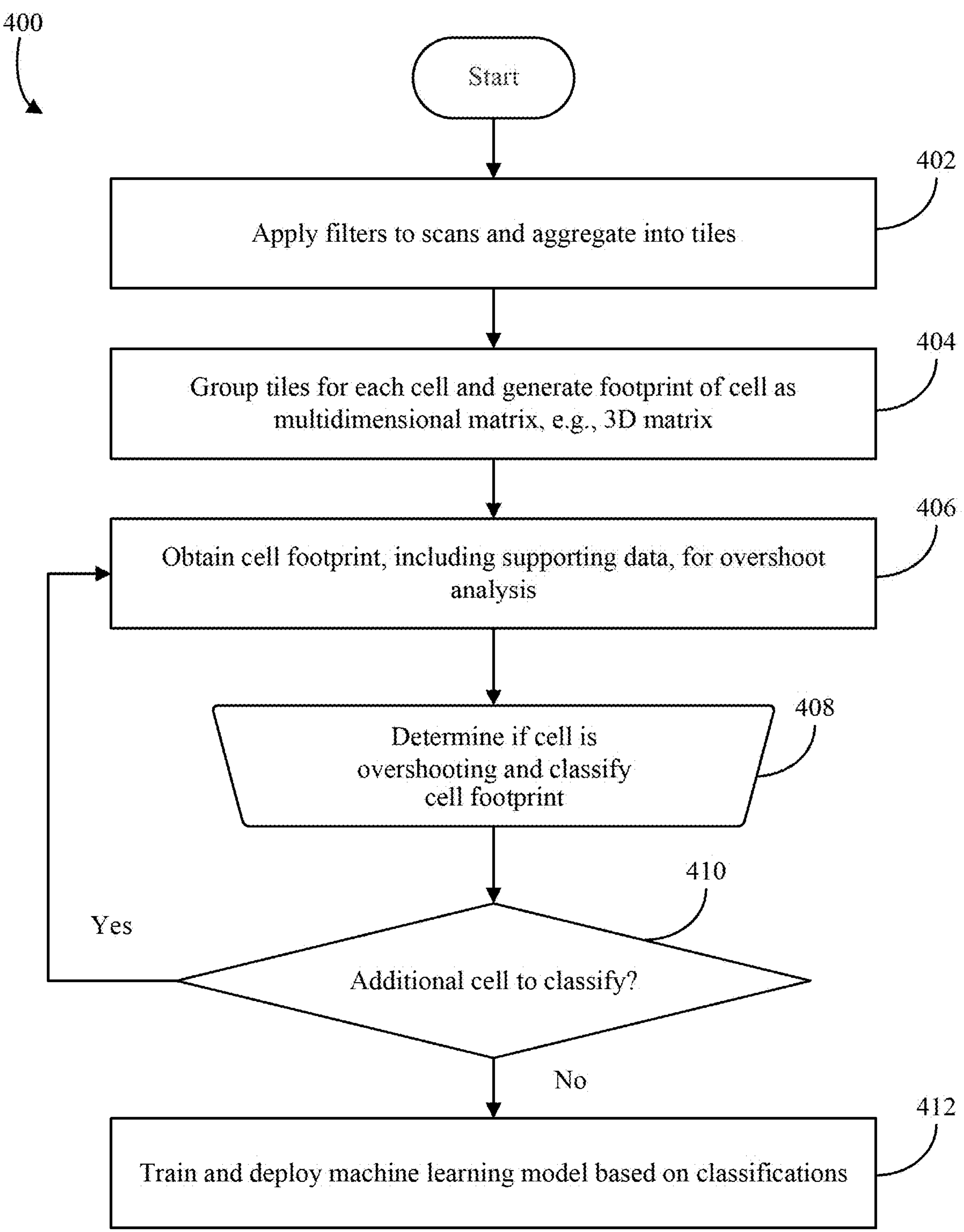
FIG. 4 is a flowchart of an example of a process for training a machine learning model to determine overshooting cells of base stations in mobile networks.

FIG. 4 is a flowchart of an example of a process 400 for training a machine learning model (e.g., the machine learning model stored in the data structure 110) to determine overshooting cells of base stations in mobile networks (e.g., cellular networks). The process 400 can be executed using computing devices, such as the systems, hardware, and software described herein. The process 400 can be performed, for example, by executing a machine-readable program or other computer-executable instructions, such as routines, instructions, programs, or other code. The steps, or operations, of the process 400 or another process, method, technique, or algorithm described in connection with the implementations disclosed herein can be implemented directly in hardware, firmware, software executed by hardware, circuitry, or a combination thereof.

For simplicity of explanation, the process 400 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At operation 402, a system (e.g., the overshoot detection system 108) may apply filters to radio measurements of signals from cells in a dataset and may aggregate the radio measurements from the cells into particular tiles. At operation 404, the system may group the tiles for each cell and generate a footprint of the cell as multidimensional matrix, e.g., 2D or 3D matrix. At operation 406, the system may obtain a footprint for a particular cell, including supporting data in the environment, for overshooting analysis. At operation 408, the system may receive input (e.g., a label), to indicate whether the cell is overshooting, and may classify the footprint accordingly. For example, the system could receive training input that classifies the cell, based on the footprint, as either "overshooting" or "normal."

At operation 410, the system may determine whether there is an additional cell to classify (e.g., a next cell having a footprint, like the cell 118). If there is another cell to classify ("Yes"), the system can return to operation 406. However, if there is not another cell to classify ("No"), at operation 410, the system can train the machine learning model based on the foregoing classifications and deploy the machine learning model to make classifications of other cells in a geographic area (e.g., the cell 104). In some implementations, different sizes of training datasets may be utilized to realize different patterns that may be learned by the machine learning model. In some implementations, the machine learning model may continue training when deployed, such as via a feedback loop including radio measurements and classifications in the field.

In some implementations, training the input layer of the machine learning model may involve providing a list of matrices with particular shape, e.g., (number of inputs)×(input height)×(input width)×(input channels). The input channels may comprise an array of different radio measurement types (e.g., signal power level, signal quality, and/or propagation delay) having a fixed size. However, when deployed in the geographic area, the height input and the width input may vary (e.g., the tiles may be variable in size). For example, the radius of a cell could be any size, and when the overshoot detection system 108 selects a fixed dimension of "x" for the tile size, a different number of tiles may be formed depending on the selection, resulting in a matrix that might not match training of the model. Therefore, the overshoot detection system 108 can reshape the matrix based on a determination of new tile sizes.

Figure 5:
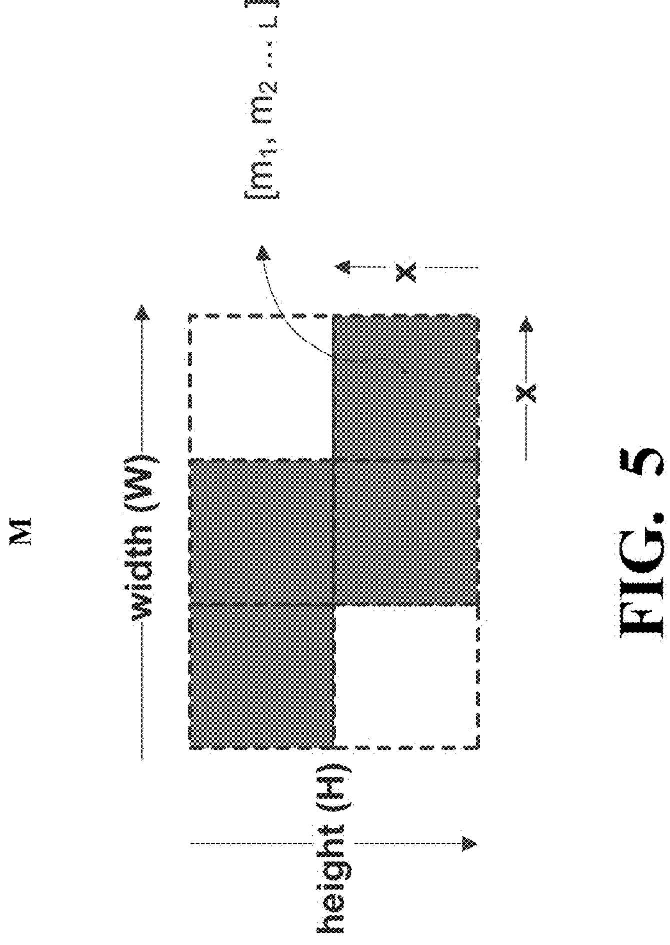
FIG. 5 is an example of a multidimensional matrix for determining overshooting cells of base stations in mobile networks.

For example, with reference to FIG. 5, a footprint of the cell 104 may be represented by a multidimensional matrix M of size H (height)×W (width)×L (length). The positions of tiles 120 in the geographic area may correspond to the positions of elements in the matrix M. e.g., the H and W in the matrix M. Additionally, the number of aggregated radio measurement types in tiles 120 may correspond to the length L in the matrix M. In some cases, the elements may include null values based on radio measurements in tiles failing to satisfy a filtering criterion. With additional reference to FIG.

6, the overshoot detection system 108 can transform the matrix M to generate an input matrix I of size A×A×L (e.g., another multidimensional matrix, larger than the matrix M). The transformation may include mathematically resizing and/or reshaping the matrix M to generate the matrix I, which may be sized to achieve compatibility with training of the machine learning model. For example, the machine learning model may be trained to receive matrices, and generate inferences, based on matrices sized like the matrix I. The matrix I may be a larger matrix that may be utilized by the machine learning model to determine the overshoot. As a result, the overshoot detection system 108 can efficiently determine overshoot from a pattern of the matrix I, generated based on the matrix M, without losing information.

In some implementations, the overshoot detection system 108 can utilize the following method to transform the matrix M to the matrix I. For a set of cells "C," select an "A" such that:

$$\forall\, i \in C,\ A \geq D_i \text{ where } D_i = \left\lceil \sqrt{H_i^2 + W_i^2} \right\rceil$$

Here "$H_i$" and "$W_i$" represent height and width of a cell "i" footprint in "C". This may enable avoiding a loss of information based on a rotation of the footprint from its center. For example, rural sites can reach up to tens of kilometers in range or more. To cover an area having tiles of 250 meters×250 meters (e.g., x=250 meters in FIG. 3), the overshoot detection system 108 can select A=256, covering an area of 64 kilometers×64 kilometers. The overshoot detection system 108 can adjust these values based on various conditions, such as the size of the geographic area, and/or the density of cells or base stations in the geographic area.

In some implementations, for a cell i, with $H_i \times W_i$ as width and height of a cell footprint, the overshoot detection system 108 can calculate a coefficient $c_i$ as follows:

$$c_i = \left\lfloor \frac{A}{D_i} \right\rfloor$$

Figure 6:
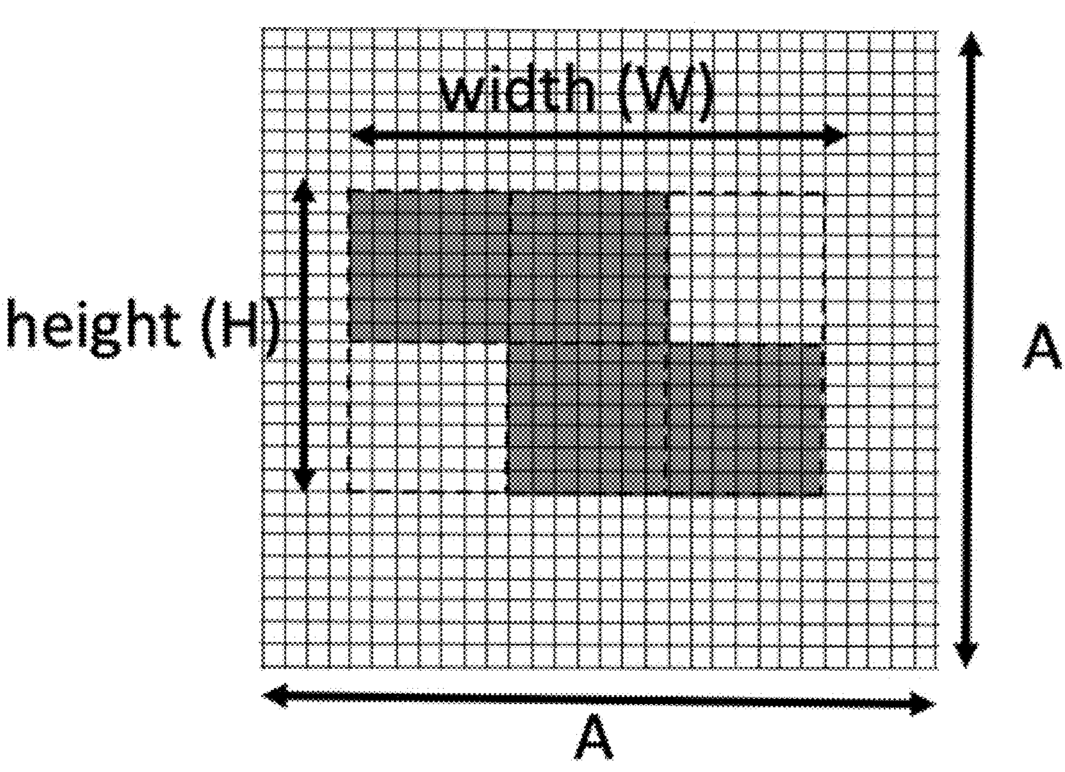
FIG. 6 is an example of an input matrix utilized by a machine learning model to determine overshooting cells of base stations in mobile networks.

For example, the overshoot detection system 108 can extend matrix M by copying each element $c_i$ times in $H_i$ and $W_i$ directions. The new matrix may have dimensions $(H_i*c_i)\times(W_i*c_i)$. In some cases, the overshoot detection system 108 can pad remaining $(A-H_i*c_i)$ and $(A-W_i*c_i)$ rows and columns with null values (e.g., nulls corresponding to tiles that do not have radio measurements satisfying the filtering criterion). In some cases, the overshoot detection system 108 can utilize the mathematical algorithm of the above method. FIGS. 5 and 6 include illustrations of the above method for H=2, W=3 and A=30.

When the transformations are applied, the overshoot detection system 108 can utilize a training dataset based on determining two classes (e.g., overshooting or normal) with standardized height, width, and channel sizes. This can be used to train the machine learning model, e.g., the CNN, and to make predictions based on new input. In some cases, the overshoot detection system 108 can apply additional techniques, such as oversampling, class weights, and data augmentation (e.g., and in some cases, with constraints, such as exclusions of zooming, shifting, and/or rotating) to achieve balancing.

Once the machine learning model is trained with a predetermined level of accuracy and/or loss, the machine learning model can be applied to any number of footprints that are converted to the valid input (e.g., transformed from the multidimensional matrix to the input matrix). In some cases, for localized models, a general model can be used as a starting point. Additionally, a machine learning model that is trained in one network can be used in another network, including at a same or different geographical location. Further, a machine learning model that is trained in one network can be used in the same network at a different time. When used in a network, the overshoot detection system 108 may enable changing configurations of cells and/or base stations (e.g., the cell 104 of the base station 102) to mitigate the determined overshoot.

Figure 7:
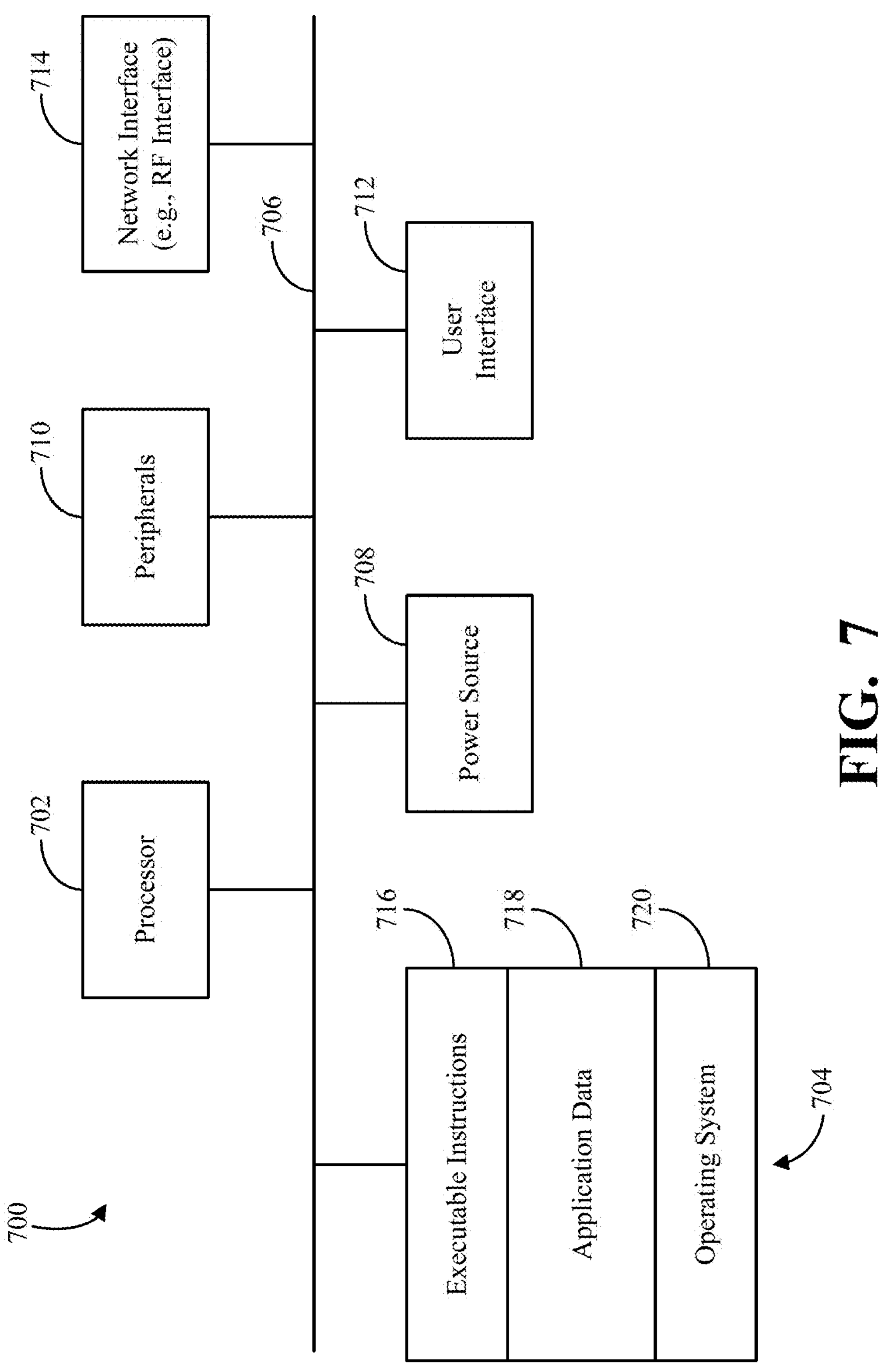
FIG. 7 is a block diagram of an example internal configuration of a computing device for determining overshooting cells of base stations in mobile networks.

FIG. 7 is a block diagram of an example internal configuration of a computing device 700 of a system for determining overshooting cells of base stations in mobile networks (e.g., a cellular network, such as LTE or 5G). In one configuration, the computing device 700 may implement the overshoot detection system 108 shown in FIG. 1. In another configuration, the computing device 700 may implement the user device 106 shown in FIG. 1.

The computing device 700 includes components or units, such as a processor 702, a memory 704, a bus 706, a power source 708, peripherals 710, a user interface 712, a network interface 714, other suitable components, or a combination thereof. One or more of the memory 704, the power source 708, the peripherals 710, the user interface 712, or the network interface 714 can communicate with the processor 702 via the bus 706.

The processor 702 is a central processing unit, such as a microprocessor, and can include single or multiple processors having single or multiple processing cores. Alternatively, the processor 702 can include another type of device, or multiple devices, configured for manipulating or processing information. For example, the processor 702 can include multiple processors interconnected in one or more manners, including hardwired or networked. The operations of the processor 702 can be distributed across multiple devices or units that can be coupled directly or across a local area or other suitable type of network. The processor 702 can include a cache, or cache memory, for local storage of operating data or instructions (e.g., the data structure 110).

The memory 704 includes one or more memory components, which may each be volatile memory or non-volatile memory. For example, the volatile memory can be random access memory (RAM) (e.g., a DRAM module, such as double data rate (DDR) DRAM). In another example, the non-volatile memory of the memory 704 can be a disk drive, a solid state drive, flash memory, or phase-change memory. In some implementations, the memory 704 can be distributed across multiple devices. For example, the memory 704 can include network-based memory or memory in multiple clients or servers performing the operations of those multiple devices.

The memory 704 can include data for immediate access by the processor 702. For example, the memory 704 can include executable instructions 716, application data 718, and an operating system 720. The executable instructions 716 can include one or more application programs, which can be loaded or copied, in whole or in part, from non-volatile memory to volatile memory to be executed by the processor 702. For example, the executable instructions 716 can include instructions for performing some or all of the techniques of this disclosure. The application data 718 can include user data, database data (e.g., database catalogs or dictionaries), or the like. In some implementations, the application data 718 can include functional programs, such as a web browser, a web server, a database server, another program, or a combination thereof. The operating system 720 can be, for example, any known personal or enterprise operating system; an operating system for a mobile device, such as a smartphone or tablet device; or an operating system for a non-mobile device, such as a mainframe computer.

The power source 708 provides power to the computing device 700. For example, the power source 708 can be an interface to an external power distribution system. In another example, the power source 708 can be a battery, such as where the computing device 700 is a mobile device or is otherwise configured to operate independently of an external power distribution system. In some implementations, the computing device 700 may include or otherwise use multiple power sources. In some such implementations, the power source 708 can be a backup battery.

The peripherals 710 includes one or more sensors, detectors, or other devices configured for monitoring the computing device 700 or the environment around the computing device 700. For example, the peripherals 710 can include a geolocation component, such as a global positioning system location unit. In another example, the peripherals can include a temperature sensor for measuring temperatures of components of the computing device 700, such as the processor 702. In some implementations, the computing device 700 can omit the peripherals 710.

The user interface 712 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, virtual reality display, or other suitable display.

The network interface 714 provides a connection or link to a network (e.g., the RAN shown in FIG. 1). The network interface 714 can be a wired network interface or a wireless network interface. The computing device 700 can communicate with other devices via the network interface 714 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 8:
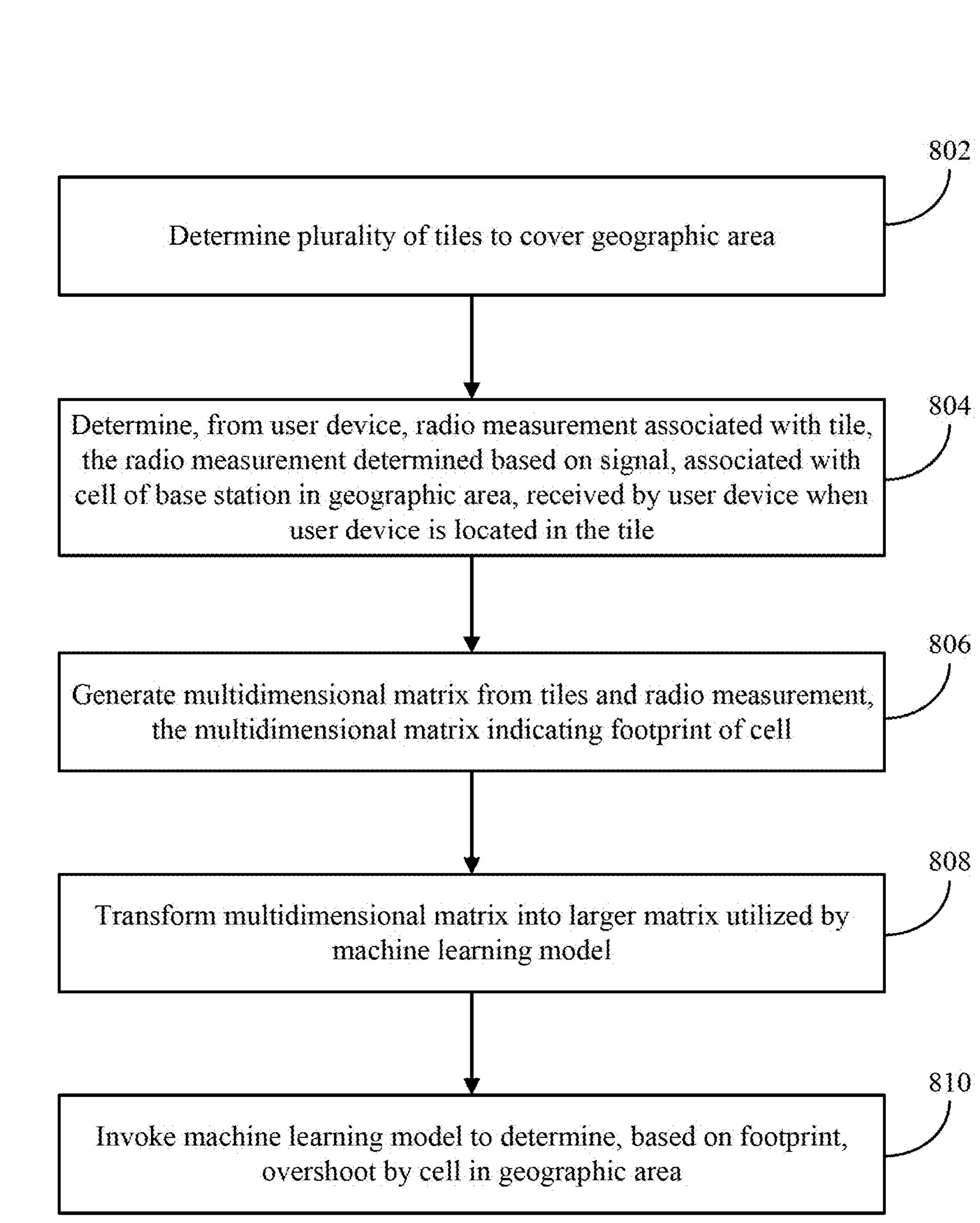
FIG. 8 is a flowchart of an example of a process for determining overshooting cells of base stations in mobile networks.

FIG. 8 is a flowchart of an example of a process 800 for determining cell overshoot of base station in mobile networks (e.g., a cellular networks). The process 800 can be executed using computing devices, such as the systems, hardware, and software described with respect to FIGS. 1-7. The process 800 can be performed, for example, by executing a machine-readable program or other computer-executable instructions, such as routines, instructions, programs, or other code. The steps, or operations, of the process 800 or another process, method, technique, or algorithm described in connection with the implementations disclosed herein can be implemented directly in hardware, firmware, software executed by hardware, circuitry, or a combination thereof.

For simplicity of explanation, the process 800 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At operation 802, a system (e.g., the overshoot detection system 108) may determine a plurality of tiles (e.g., the tiles 120) to cover a geographic area. For example, the tiles may be equally sized regions that are adjacent to one another in a coverage area. In some cases, the tiles may be circular, rectangular, square, polygon, or another shape. A plurality of these tiles, and their position with respect to each other, may be represented in a multidimensional matrix, e.g., a 2D or 3D matrix.

At operation 804, the system may determine, from a user device (e.g., UE, such as the user device 106), a radio measurement associated with a tile of the plurality of tiles. The radio measurement may be determined based on a signal (e.g., an RF transmission), associated with a cell of a base station (e.g., the cell 104 of the base station 102) in the geographic area, which is received by the user device when the user device is located in the tile. For example, the measurement could be a power level, signal quality, or propagation delay, determined from an RF transmission.

At operation 806, the system may generate a multidimensional matrix (e.g., a 2D or 3D matrix, such as the multidimensional matrix M of FIG. 5), from the plurality of tiles and the radio measurement. The multidimensional matrix may indicate a footprint of the cell. For example, the footprint may represent a coverage area where user devices can connect to signals from the cell.

At operation 808, the multidimensional matrix may be transformed (e.g., resized) into a larger matrix (e.g., a 2D or 3D matrix, such as the multidimensional matrix I of FIG. 6) to enable utilization of a machine learning model that determines overshooting cells of base stations in a mobile network. In some cases, the multidimensional matrix may represent an image, such as a black and white (e.g., grayscale) or color (e.g., RGB) image or any other type of image with one or more channels.

At operation 810, the system may invoke a machine learning model to determine, based on the footprint, an overshooting cell, or normal operation of the cell, in the geographic area. For example, the machine learning may be trained based on the process 400 of FIG. 4. In some cases, the machine learning model may comprise a trained image classifier implemented by a CNN. For example, the trained image classifier may determine, based on an image of the footprint (e.g., a grayscale image, an RGB image, or any other type of image with one or more channels), overshoot or normal operation. The system may then enable changing a configuration of the cell and/or the base station based on the determination to mitigate undesirable overshooting.

Some implementations may include a method for determining an overshooting cell of a base station in a cellular network. The method may include determining a plurality of tiles to cover a geographic area. The method may further include determining, from a user device, a radio measurement associated with a tile of the plurality of tiles. The radio measurement may be determined based on a signal, associated with a cell of the base station in the geographic area, which is received by the user device when the user device is located in the tile. The method may further include generating a multidimensional matrix from the plurality of tiles and the radio measurement. The multidimensional matrix may indicate a footprint of the base station. The method may further include invoking a machine learning model to determine, based on the footprint, an overshoot by the cell in the geographic area.

In some implementations, the method may include training the machine learning model based on footprints from a plurality of cells in a plurality of base stations. At least one of the footprints may indicate a normal operation and another of the footprints may indicate an overshoot. In some implementations, determining the plurality of tiles includes dividing the geographic area into equally sized regions that are adjacent to one another and include a coverage area for the base station. In some implementations, the multidimensional matrix includes i) a position of each tile of the plurality of tiles in the geographic area, and ii) an aggregated value of radio measurements associated with the tile. In some implementations, the footprint represents a coverage area where user devices can connect to signals from the cell. In some implementations, the method may include transforming the multidimensional matrix into a larger matrix utilized by the machine learning model to determine the overshoot. In some implementations, the method may include resizing or reshaping the multidimensional matrix for compatibility with training of the machine learning model. In some implementations, the multidimensional matrix represents a grayscale or color image. In some implementations, the machine learning model comprises a trained image classifier. In some implementations, the machine learning model comprises a CNN. In some implementations, the method may include changing a configuration of the base station based on determining the overshoot. In some implementations, the method may include determining, from the user device, a plurality of measurements of a same type corresponding to the tile, wherein the radio measurement is an aggregate of the plurality of measurements. In some implementations, the method may include determining, from the user device, a plurality of measurements of different types corresponding to the tile. The multidimensional matrix includes a plurality of aggregated values of measurement types in a dimension as different channels. In some implementations, the radio measurement is a type that indicates a power level, a signal quality, or a propagation delay of the signal to the user device. In some implementations, the method may include determining a size of the tile based on at least one of a size of the geographic area or a density of base stations in the geographic area. In some implementations, the multidimensional matrix includes null values corresponding to tiles of the plurality of tiles that do not have radio measurements satisfying a filtering criterion.

Some implementations may include an apparatus including a memory and a processor configured to execute instructions stored in the memory. The processor may execute the instructions to determine a plurality of polygons to cover a geographic area. The processor may further execute the instructions to determine, from a user device, a radio measurement associated with a polygon of the plurality of polygons. The radio measurement may be determined based on a signal, associated with a cell of a base station in the geographic area, which is received by the user device when the user device is located in the polygon. The processor may further execute the instructions to generate a 3D matrix from the plurality of polygons and the radio measurement. The 3D matrix may indicate a footprint of the cell. The processor may further execute the instructions to invoke a machine learning model to determine, based on the footprint, an overshoot by the cell in the geographic area. In some implementations, the operations further include receiving GPS information from the user device that indicates a time and a location corresponding to the radio measurement. In some implementations, the operations further include determining, from the user device, a plurality of measurements corresponding to the polygon. The radio measurement may comprise a median of the plurality of measurements. In some implementations, the operations further include receiving a plurality of measurements from a plurality of user devices in the geographic area; and generating the 3D matrix based on the plurality of measurements.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for determining an overshooting cell of a base station in a mobile network, the method comprising:

determining a plurality of tiles to cover a geographic area;

determining, from a user device, a radio measurement associated with a tile of the plurality of tiles, the radio measurement determined based on a signal, associated with a cell of the base station in the geographic area, which is received by the user device when the user device is located in the tile;

generating a multidimensional matrix from the plurality of tiles and the radio measurement, the multidimensional matrix indicating a footprint of the cell;

transforming the multidimensional matrix to an image of the footprint; and invoking a machine learning model comprising a trained image classifier to determine, based on the image, an overshoot or a normal operation by the cell in the geographic area.

2. The method of claim 1, further comprising:

training the machine learning model based on images of footprints from a plurality of cells in a plurality of base stations, wherein at least one of the footprints indicates the normal operation and another of the footprints indicates the overshoot.

3. The method of claim 1, wherein determining the plurality of tiles includes dividing the geographic area into equally sized regions that are adjacent to one another and include a coverage area for the base station.

4. The method of claim 1, wherein the multidimensional matrix includes i) a position of each tile of the plurality of tiles in the geographic area, and ii) an aggregated value of radio measurements associated with the tile.

5. The method of claim 1, wherein the footprint represents a coverage area where user devices can connect to signals from the cell.

6. The method of claim 1, wherein transforming the multidimensional matrix includes transforming into a larger matrix utilized by the machine learning model to determine the overshoot.

7. The method of claim 1, wherein transforming the multidimensional matrix includes resizing or reshaping the multidimensional matrix for compatibility with training of the machine learning model.

8. The method of claim 1, wherein the multidimensional matrix represents a grayscale or color image.

9. The method of claim 1, wherein the multidimensional matrix is a 3D matrix that includes different types of radio measurements in the plurality of tiles.

10. The method of claim 1, wherein the machine learning model comprises a convolutional neural network (CNN).

11. The method of claim 1, further comprising:

changing a configuration of the base station based on determining the overshoot.

12. The method of claim 1, further comprising:

determining, from the user device, a plurality of measurements of a same type corresponding to the tile, wherein the radio measurement is an aggregate of the plurality of measurements.

13. The method of claim 1, further comprising:

determining, from the user device, a plurality of measurements of different types corresponding to the tile, wherein the multidimensional matrix includes a plurality of aggregated values of measurement types in a dimension as different channels.

14. The method of claim 1, wherein the radio measurement is a type that indicates a power level, a signal quality, or a propagation delay of the signal to the user device.

15. The method of claim 1, further comprising:

determining a size of the tile based on at least one of a size of the geographic area or a density of base stations in the geographic area.

16. The method of claim 1, wherein the multidimensional matrix includes null values corresponding to tiles of the plurality of tiles that do not have radio measurements satisfying a filtering criterion.

17. A non-transitory computer readable medium storing instructions operable to cause one or more processors to perform operations comprising:

determining a plurality of polygons to cover a geographic area;

determining, from a user device, a radio measurement associated with a polygon of the plurality of polygons, wherein the radio measurement is determined based on a signal, associated with a cell of a base station in the geographic area, which is received by the user device when the user device is located in the polygon;

generating a 3D matrix from the plurality of polygons and the radio measurement, the 3D matrix indicating a footprint of the cell; and invoking a machine learning model to determine, based on the footprint, an overshoot by the cell in the geographic area.

18. The non-transitory computer readable medium storing instructions of claim 17, the operations further comprising:

receiving global positioning system (GPS) information from the user device that indicates a time and a location corresponding to the radio measurement.

19. The non-transitory computer readable medium storing instructions of claim 17, the operations further comprising:

determining, from the user device, a plurality of measurements corresponding to the polygon, wherein the radio measurement is a median of the plurality of measurements.

20. The non-transitory computer readable medium storing instructions of claim 17, the operations further comprising:

receiving a plurality of measurements from a plurality of user devices in the geographic area; and generating the 3D matrix based on the plurality of measurements.

* * * * *